UNITED STATES PATENT OFFICE.

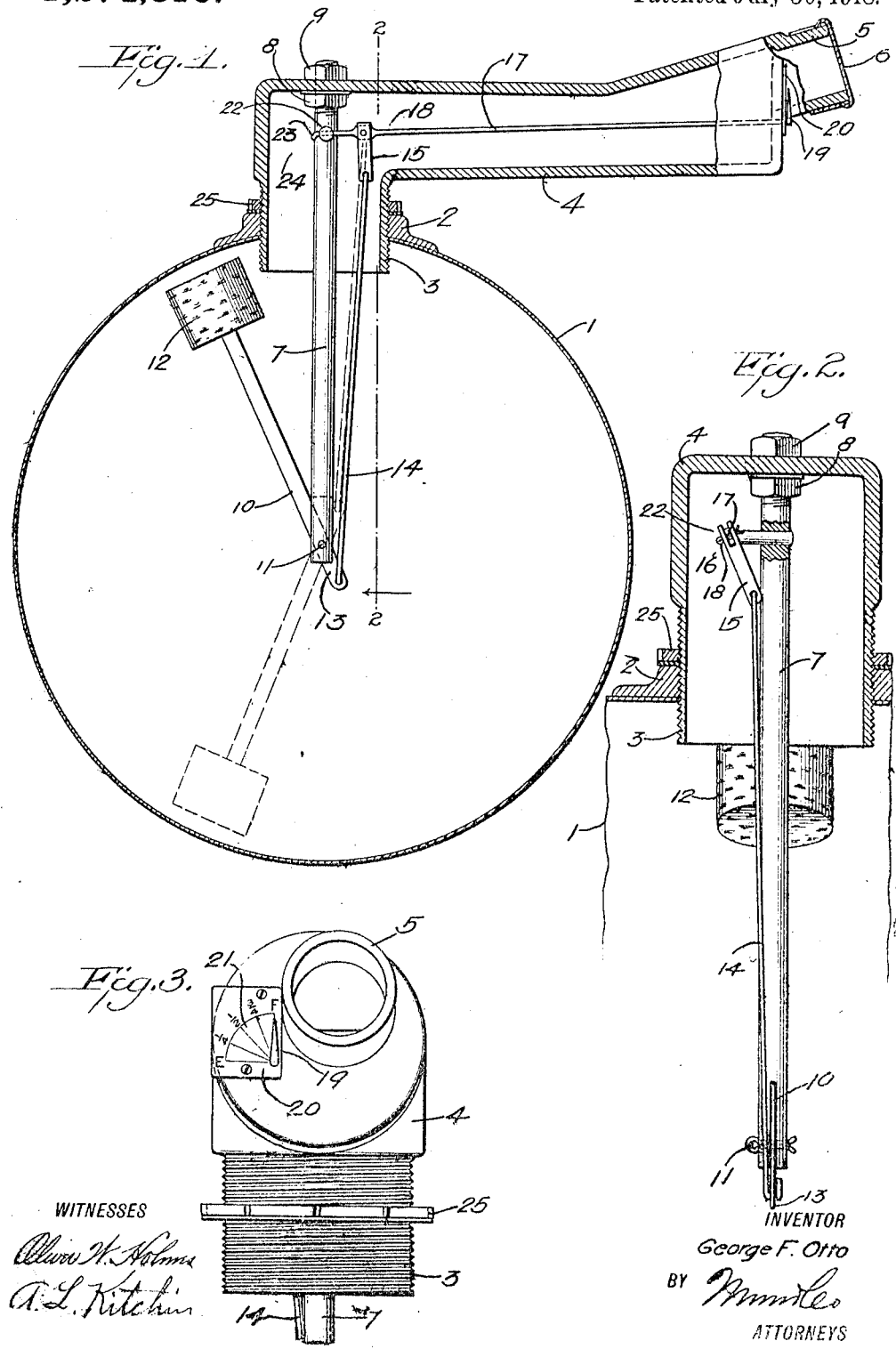

GEORGE F. OTTO, OF DETROIT, MICHIGAN.

TANK-FILLER.

1,274,316.  Specification of Letters Patent.  Patented July 30, 1918.

Application filed November 9, 1917. Serial No. 201,092.

*To all whom it may concern:*

Be it known that I, GEORGE F. OTTO, a citizen of the United States, and a resident of Detroit, in the county of Wayne and State of Michigan, have invented a new and Improved Tank-Filler, of which the following is a full, clear and exact description.

This invention relates to tank fillers and has for an object the provision of an improved arrangement whereby the tank may be supplied with gasolene or other fuel, and the level thereof constantly indicated at a given point.

A further object of the invention is to provide a filler for gasolene tanks on automobiles and other vehicles wherein a float is connected with a rotatable indicating finger for causing the indicating finger to assume a proper position in relation to the amount of gasolene in the tank.

In the accompanying drawing:

Figure 1 is a transverse sectional view through a tank and through a filler connected therewith, said filler disclosing an embodiment of the invention.

Fig. 2 is a section through Fig. 1 on line 2—2.

Fig. 3 is an end view of the filler shown in Fig. 1, same being on an enlarged scale.

Referring to the accompanying drawing by numerals, 1 indicates a tank of any desired kind, as for instance the conventional tank used on an automobile, said tank being provided with a reinforced threaded ring 2 so as to accommodate the threaded end 3 of the filler pipe 4. Filler pipe 4 is provided with a nozzle or filling end 5 over which a cap 6 is slidingly fitted, said cap being for the purpose of providing a cover so as to prevent foreign matter from entering. A rod 7 is attached by nuts 8 and 9 to the side of filler pipe 4 in such a manner that the rod may extend through the threaded extension 3 into the tank 1 any desired distance. A lever 10 is pivotally mounted at 11 on the end of the rod 7 said lever carrying a float 12 at its outer end, said float being of metal, cork or other desired material. The short end 13 of lever 10 is provided with an aperture in which a link 14 is pivotally mounted, said link being pivotally mounted also on the arm 15. Arm 15 is preferably made from a piece of round rod slotted at one end so as to provide a clamping means 16, clamping rotatable rod 17. A fastener bolt 18 extends through arm 15 at the point where it is flattened, as shown in Fig. 2, whereby the arm or plate 15 may be clamped to the rod 17 in order to properly indicate the position of the indicating finger 19 arranged on the face 20 to which the shaft 17 is joined. Face plate 20 is provided with a scale 21 indicating the amount of gasolene or other fuel in tank 1. When the parts are in the position shown in Fig. 3, the finger indicates that the tank 1 is full, whereas if the finger was at the point marked one half it would indicate that the tank was half full. Rod 17 is normally journaled in the plate 20 and is also journaled in the pin 22 fitted tightly in rod 7. This provides a bracket for rotatably supporting shaft 47 in such a manner as to not be easily gotten out of order. In connection with shaft 17 it will be noted that the same is preferably round throughout except at the point where it fits in the arm 15 where it is flattened and the flattened portion engages flatwise the slot in arm 15. This arrangement insures the proper turning of the rod 17 as the flap moves up or down. After the filler pipe 4 has been placed in position a lock nut 25 is screwed down upon the middle tube so as to lock the parts against accidental movement whereupon the tank may be used in the usual manner and the finger 19 continually indicating the amount of fuel in the tank.

If desired the plate 20 may be removed at any time so as to secure access to the interior of the tube 4, or if preferred tube 4 may be easily removed by merely rotating the same so as to unscrew the threaded extension 3.

What I claim is:

1. In a device of the character described, the combination with a tank, of a filling tube therefor formed with a threaded extension fitting into said tank and a body extending substantially at right angles to the extension, a rod extending through one wall of said body and through substantially the center of said extension longitudinally thereof, means for locking said rod against movement, a bracket arranged on said rod in said tube, a shaft having one end rotatably mounted in said bracket and extending to a point exterior of one end of said body, and indicating member arranged on said shaft exterior of said body, a float arranged in said tank, and means for connecting said float with said shaft so as to rotate the shaft as the float goes up and down, whereby said indicating means will be operated.

2. The combination with a tank of a filling and indicating device, said filling device comprising a tube having a vertical section and a horizontal section merging into a filling opening, and an indicating means comprising a dial on one end of said tube, a finger for moving over said dial, a shaft connected with said finger and extending longitudinally of said tube, a rod extending through the top wall of said tube, clamping means for clamping said rod rigidly in position so as to extend downwardly from said tube into said tank, a pin extending through said rod at substantially right angles thereto and acting as a supporting bracket, said pin having an aperture in which the shaft connected with the indicating finger is journaled, an arm rigidly secured to said last mentioned rod, a float pivotally mounted on the rod extending into the tank, and a link connected with said float and with said arm whereby as the float moves up and down the arm is moved and the shaft connected thereto is rocked for moving said indicating finger.

GEORGE F. OTTO.